Aug. 28, 1928.

B. M. SHIPLEY

CASH REGISTER

Filed May 7, 1923

Inventor
Bernis M. Shipley
By
His Attorneys

Aug. 28, 1928.

B. M. SHIPLEY 1,682,196

CASH REGISTER

Filed May 7, 1923

Inventor
Bernis M. Shipley

By

His Attorneys

Aug. 28, 1928.
B. M. SHIPLEY
CASH REGISTER
Filed May 7, 1923 4 Sheets-Sheet 3
1,682,196
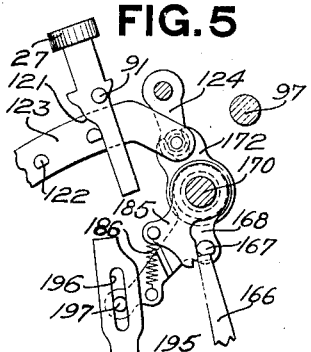
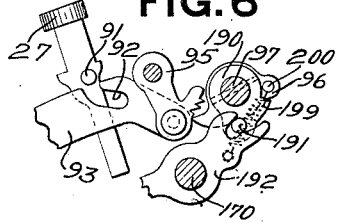
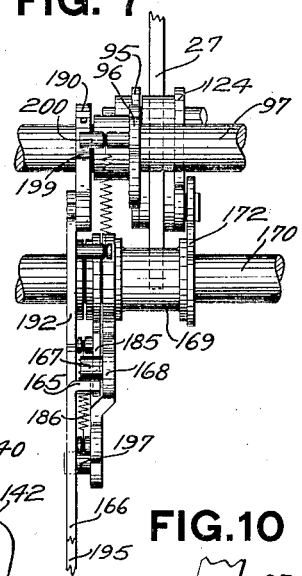
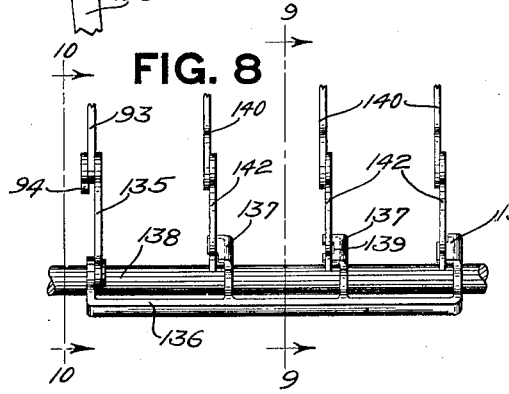
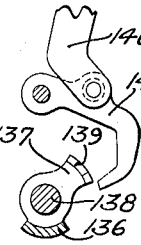
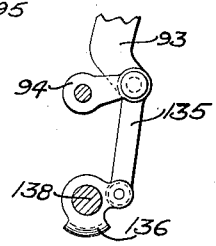
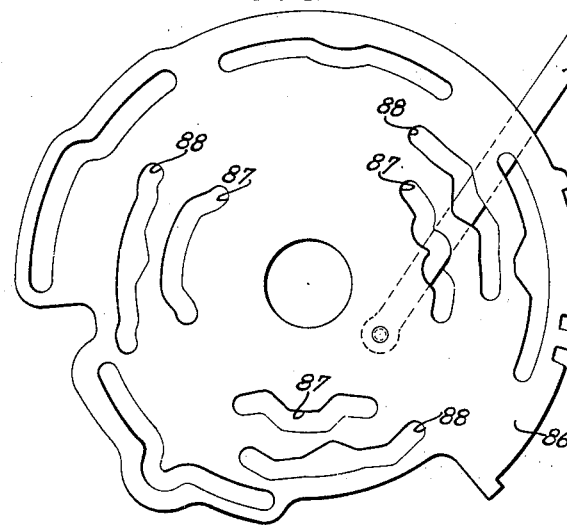
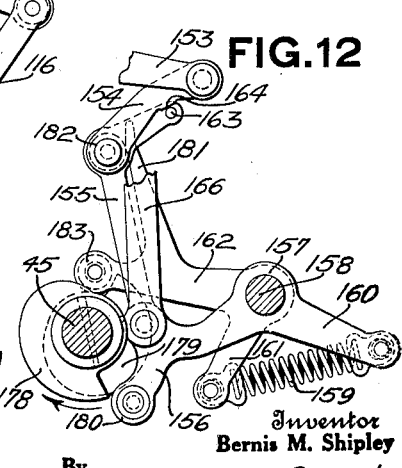
Inventor
Bernis M. Shipley
By
Earl Beust
Henry E Stauffer
His Attorneys Aug. 28, 1928.
B. M. SHIPLEY
1,682,196
CASH REGISTER
Filed May 7, 1923    4 Sheets-Sheet 4
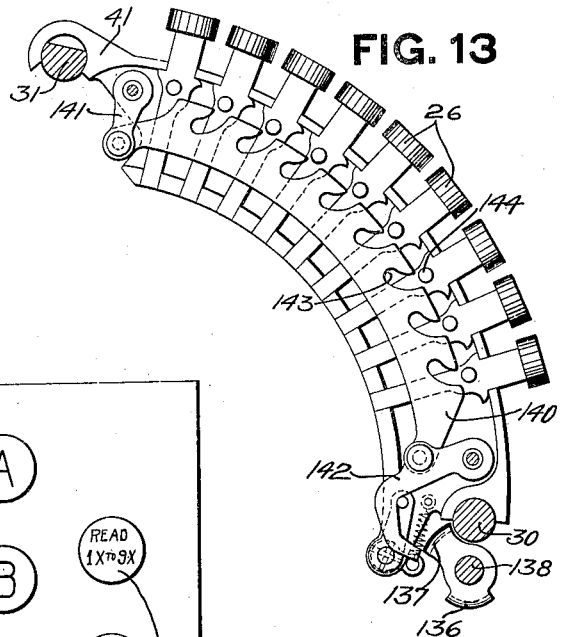
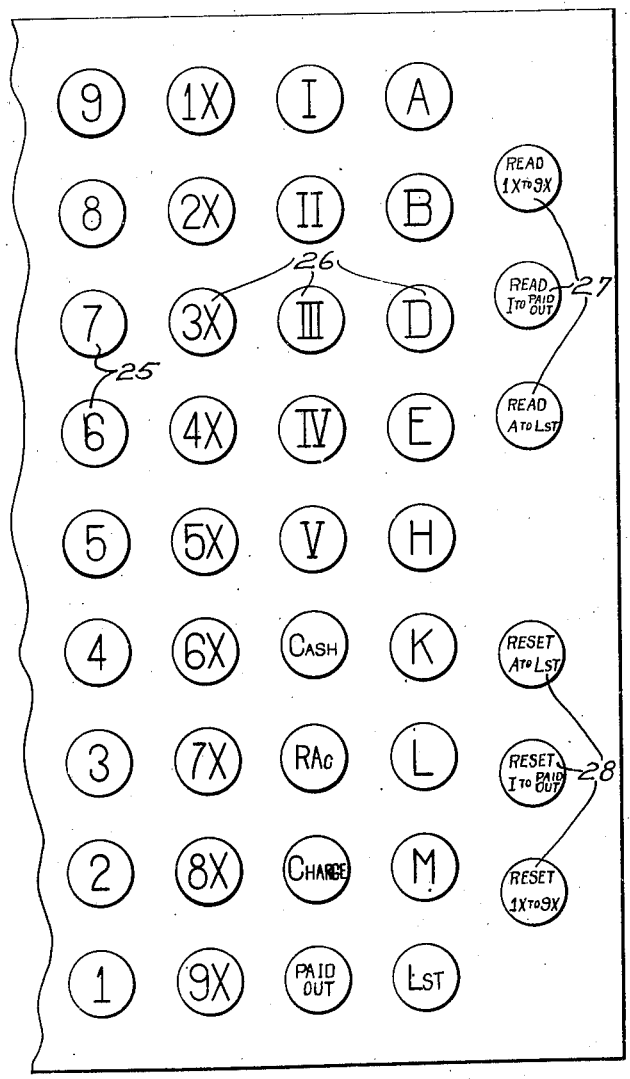
Inventor
Bernis M. Shipley
By *Hearl Beust,*
*Henry E Stauffer*
His Attorneys Patented Aug. 28, 1928.

1,682,196

UNITED STATES PATENT OFFICE.

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed May 7, 1923. Serial No. 637,217.

This invention relates to cash registers.

One object of this invention is to provide novel means for controlling the totalizers on total and subtotal taking operations.

Another object of this invention is to provide means whereby it will be impossible to release the machine if an amount key and a control key are in depressed position at the same time.

Another object of this invention is to permit the depression of a key only in the bank of transaction keys corresponding to the control key depressed.

With these and incidental objects in view, the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 5 is a detail side elevation of a portion of the mechanism for tripping the totalizer control mechanism.

Fig. 6 is a detail side view of the means for locking and releasing the control keys.

Fig. 7 is a rear view of the locking and releasing mechanism as indicated by the line 7—7 of Fig. 2.

Fig. 8 is a diagrammatic view of the interlocking mechanism which permits a key to be depressed in the bank which corresponds to the key depressed in the totalizer control bank.

Fig. 9 is a section taken on the line 9—9 of Fig. 8.

Fig. 10 is a detail sectional view taken on the line 10—10 of Fig. 8.

Fig. 11 is a detail side elevation of the totalizer controlling plate and a portion of the means for adjusting it.

Fig. 12 is a detail side elevation of the means for tripping the totalizer control mechanism and also the cams for restoring the same to its normal position.

Fig. 13 is a detail side elevation of one of the transaction banks of keys and shows a portion of the interlocking mechanism which cooperates therewith.

Fig. 14 is a diagrammatic view of a part of the keyboard of the machine.

General description.

The machine to which this invention is applied is shown and described in the patents to F. L. Fuller, Nos. 1,242,170 and 1,394,256, issued respectively on Oct. 9, 1917 and Oct. 18, 1921, and the patent to B M. Shipley, No. 1,619,796, issued March 1, 1927. Reference may be made to the above patents for a more detailed description of this machine.

In machines of this type three lines of totalizers are usually provided, and when it is desired to take either a total or sub-total from said totalizers it is necessary to move a total lever to one of a plurality of positions, depending upon the character of the operation to be performed. Integral with the total lever is a plate which has various characteristics and functions which are all shown and described in the above mentioned patents. In this invention the applicant has provided a plurality of keys and mechanism cooperating therewith which, upon the depression of said keys, will move the totalizer controlling plate to any one of its different positions, depending upon which one of the control keys is depressed. This setting of the control plate will occur as an incident to the operation of the machine, and therefore, no previous adjustment of the plate is necessary, as is now the case.

It is, of course, desirable that the machine should not be operated on a totalizing operation if any of the amount keys have been depressed, and mechanism is provided which will prevent the release of the machine should any of the amount keys and any of the control keys be in depressed position at the same time. It is also necessary to prevent the depression of a key in more than one of the transaction banks during a totalizing operation, as this would cause false entries to be made by the printing mechanism of the machine. Means is therefore included herein to prevent the depression of a key in any of the transaction banks except the bank corresponding to the control key depressed.

Keyboard.

A portion of the keyboard of this machine is shown in Fig. 14. It consists of a plurality of banks of amount keys 25, only one of which is shown herein, it being understood, however, that any number of amount banks may be used in machines of this class, depending upon the registering capacity desired. To the right of the amount banks are three banks of transaction keys 26 which are designated "1X" to "9X," "I" to "Paid Out" and "A" to "List." These three banks of keys are for the purpose of determining the selection and engagement of the various totalizers on adding operations and for selecting the totalizers on totalizing operations. To the right of the transaction keys is the bank of totalizer controlling keys which are used in totalizing operations only. There are six of these keys, the three upper keys 27 controlling the engagement of the three lines of totalizers on sub-total operations and the three lower keys 28 controlling the engagement on resetting operations.

Amount keys.

Figure 1:
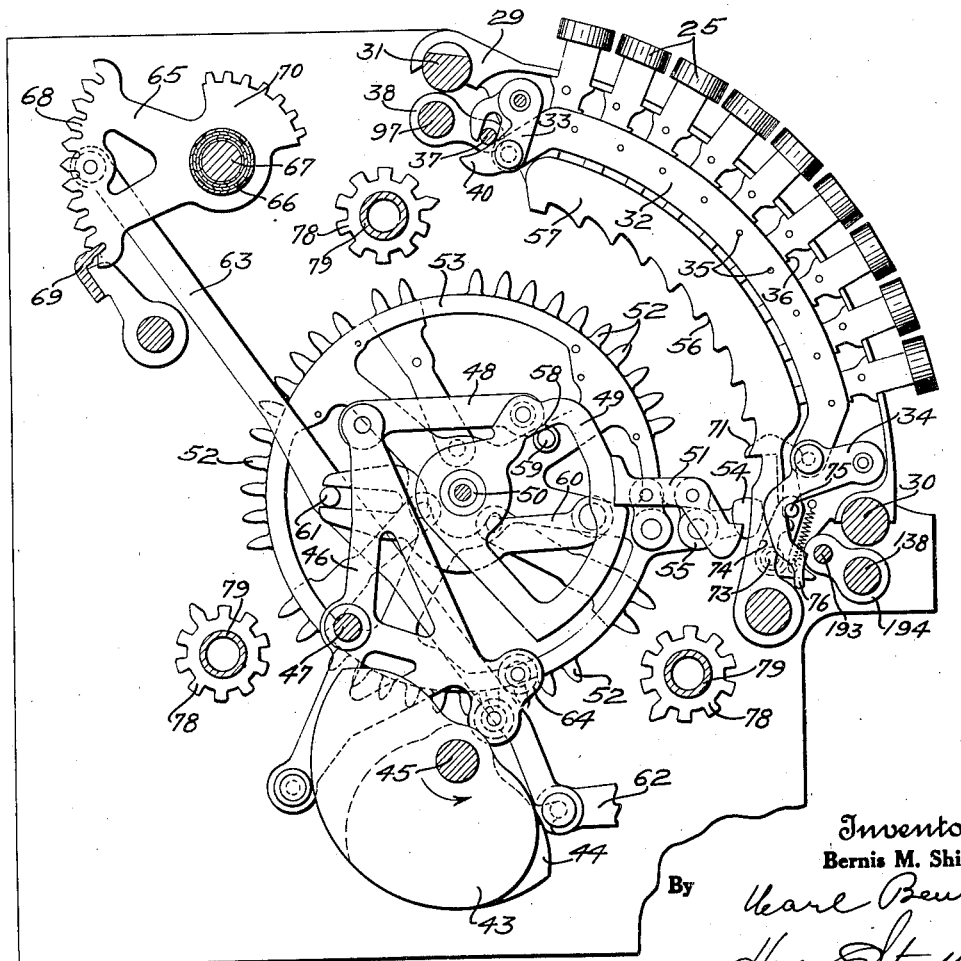
Fig. 1 is a sectional view through the machine just to the left of one of the amount banks.

The amount keys 25 (Fig. 1) are slidably mounted in a key frame 29 which is supported at its upper and lower ends by rods 31 and 30 respectively (Fig. 1). A detent 32 carried by pivotally mounted links 33 and 34, carries pins 35 which are adapted to cooperate with shoulders 36 formed on the shanks of the keys and thereby hold said keys in their depressed positions. The keys 25 are released at the end of an operation by means of a rod 37 carried by a plurality of arms 38 fast on a shaft 97. The rod 37 cooperates with a tail 40 on the link 33 which supports the detent 32, and causes said detent to be moved downwardly far enough to release the pins 35 from the shoulders 36. A locking plate (not shown) is also provided which locks the keys in their depressed positions and also locks the undepressed keys against depression.

Transactions keys.

The transaction keys 26 (Fig. 13) are slidably mounted in a key frame 41 carried by the rods 30 and 31, above mentioned. These keys when depressed are held in their depressed positions by means not shown here, but well known in the art and both shown and described in the previously mentioned patents. It is not thought necessary, therefore, to include any further description of this mechanism herein.

Amount differential mechanism.

Each bank of amount keys (Fig. 1) is provided with a differential mechanism which is old and well known in the art and which will be but briefly described herein. The differential mechanism for the amount keys is driven by two cams 43 and 44 fast on the main drive shaft 45 of the machine which is given one counter-clockwise rotation upon every operation of the said machine. The counter-clockwise movement of the cams 43 and 44 rocks a Y-shaped member 46, by means of two antifriction rollers carried thereby, in a clockwise direction (Fig. 1) about its pivot 47. Pivoted to the upper end of the Y-shaped member 46 is a link 48 which at its opposite end is pivoted to a segment 49 loosely mounted on a bushing 50 supported by a pair of differential supporting plates, not shown herein. The segment 49 is given first a counter-clockwise and then a clockwise movement on every operation of the machine, due to its connection with the Y-shaped member 46. Latched to the segment 49 by means of a latch member 51 are three totalizer actuating segments 52 which are carried by two plates 53 loosely mounted on the bushing 50. Due to this latch connection, the plates 53 and segments 52 will be carried with the segment 49 on its counter-clockwise movement until the forward end 54 of a bell crank lever 55 to which the latch member 51 is pivoted, comes into contact with the inner end of whichever one of the keys has been depressed. When this occurs, the latch member 51 will be moved forwardly out of engagement with the segment 49 and the forward end of said latch member will engage with one of a plurality of notches 56 formed on the inner edge of an arcuate bar 57. This action of the latch member 51 will stop the totalizer actuating segments 52 in the position corresponding to the key depressed. Then when the segment 49 is given its return, or clockwise, movement to zero position, a surface 58 on said segment will contact with a pin 59 carried by the plates 53, which will return the plates 53 and the totalizer actuating segments 52 to their zero positions. Pivoted to the plates 53 is a beam 60, which, at its rear end, is bifurcated and cooperates with a pin 61 carried by a link 63. The beam 60 is adapted to be differentially set, due in part, to the cooperation of a roller 64 carried by the Y-shaped member 46 therewith, in a manner well known in the art.

At its upper end the link 63 is pivoted to a segment 65 fast on one of a plurality of sleeves 66 surrounding a shaft 67 supported by the machine side frames. The segment 65 is formed with a plurality of teeth 68 with which an alining plate 69 normally engages. At the beginning of an operation the alining bar 69 is moved out of engagement with the teeth 68 on the segment 65 and it remains out of engagement therewith long enough for the parts to receive their differential adjustment in accordance with the depressed amount keys. When this has been accomplished, the alining bar 69 is again engaged with the teeth 68 and thereby alines the parts in their new positions. The differential adjustment imparted to the link 63 is transferred by a toothed sector 70 of the segment 65 to the indicating mechanism, which, however, is neither shown nor described herein, as it forms no part of this invention. At its lower end, the link 63 is pivoted to an arm 62 which, through other connections, not shown or described herein, transfers the differential adjustment to the printer in a manner which is also very well known in the art and which will therefore not be described herein.

If no key in a bank is depressed, it is necessary to provide mechanism to break the differential latch 51 in the zero position. This is accomplished by means of a pawl 71 pivoted on a shaft 73 carried by the key frame 29. Also fast on the shaft 73 is a short arm 74 carrying a pin 75 which cooperates with the upper end of a downwardly extending tail 76 of the link 34 above described. The pawl 71 is normally in a position in which it will cause the differential latch 51 to be broken at zero. If, however, any key in the bank is depressed, the detent 32 will be lowered, which will rock the link 34 counter-clockwise and, due to the engagement of the tail 76 thereof with the pin 75, will rock the pawl 71 clockwise far enough so that when the differential mechanism is rocked counter-clockwise the pawl will not be in position to cooperate therewith.

*Transaction differential mechanism.*

The differential mechanism, which is adapted to cooperate with the three banks of transaction keys, is old and well known in the art and no description thereof will be given herein. It is thought to be sufficient to say that it is very similar in its construction and operation to that for the amount banks, with, however, the omission of the totalizer actuating segments.

*Totalizers.*

Machines of the general type shown and described herein are usually equipped with three lines of totalizers. Each of these lines consists of a plurality of totalizer elements 78 loosely mounted upon tubes 79. There are a plurality of groups of totalizer elements on each of said lines, each totalizer consisting of one element in each of said groups. In order to select any totalizer on the line for operation, the entire totalizer line is shifted laterally in the machine to a position where the particular totalizer element which it is desired to operate in each group of elements will be opposite the totalizer actuating segments 52. The totalizer line carrying these particular elements is then rocked into engagement with said totalizer actuating segments 52 and upon the operation thereof, the amount set up on the keyboard will be added to the particular totalizer elements selected for operation. As is well known in the art, either one, two or all three of these totalizer lines may be selected for operation (depending upon the transaction keys depressed. No description of the selecting or engaging mechanism will be given in this application, as the means by which these functions are accomplished do not enter into the invention herein disclosed and reference may be made to the above mentioned patents for a full and complete description thereof.

*Totalizing operation.*

When it is desired to take either a total or sub-total from any desired totalizer, the transaction key controlling this totalizer is depressed, and upon operation of the machine, arrests the totalizer shifting mechanism to position said totalizer in line with the actuators 52.

The mechanism for selecting and engaging the three totalizer lines in total or sub-total operations is under control of a plate 86 (Fig. 11). The means actuated by this plate for accomplishing the above functions will not be described herein as they are not necessary to an understanding of this invention. It is thought to be sufficient to state that the conrol plate 86 is provided with a plurality of differently formed slots 87 which rock the particular totalizer reset shaft appropriate to the totalizer line selected. Another group of slots 88 select which of the three totalizer lines is to be operated.

In the machines referred to above, this control plate 86 is manually rocked either clockwise or counter-clockwise from its normal adding position by means of a lever integral therewith which projects through the cabinet of the machine. It is the principal object of this invention to arrange to mechanically set this control plate 86 during totalizing or sub-totalizing operations under the control of the keys 27 and 28 above mentioned. The mechanism whereby this is accomplished will now be described.

*Totalizing keys.*

There are three keys 28 (Figs. 2 and 14) which control the plate 86 on totalizing operations and three keys 27 which control the plate on sub-total operations. All of these keys are slidably mounted in a key frame 90 supported at its upper and lower ends by the rods 31 and 30 respectively. Each of the keys 27 and 28 carries a pin 91 (Figs. 2 and 6) adapted to cooperate with differently formed slots 92 cut in a detent bar 93. This detent bar is pivotally supported on two links 94 and 95. The detent bar 93 will be moved downwardly different distances depending upon which of the keys 27 or 28 is depressed. The link 95 has three notches formed thereon. Cooperating with these notches for the purpose of holding the depressed key in its depressed position is a spring pressed pawl 96, loose on the release shaft 97 of the machine.

It is evident that the movement of the detent bar 93 will prevent the depression of any other key in the bank.

*Total bank differential mechanism.*

Differential mechanism is provided to cooperate with the total bank of keys 27, 28. As this mechanism is identical with that normally used with transaction banks, only a brief description thereof will be given herein. It consists of a differentially movable arm 100 pivotally mounted on a bushing 101 and connected by a latch 102 to a driving segment 103 which is given first a clockwise and then a counter-clockwise movement (Fig. 2) by means of a pair of cams 104 and 105 (Fig. 3) fast on the main drive shaft 45, a Y-shaped member 106, (Figs. 2 and 3) and a link 107 in a manner well known in the art. On its clockwise movement, the forwardly extending arm of a bell crank 108 carried by the differentially movable arm 100 comes into contact with the inner end of whichever one of the keys 27, 28 has been depressed and disconnects the latch 102 from the driving segment 103. Pivoted to the arm 100 is a beam 109 which cooperates with a roller 110 carried by the Y-shaped member 106 to transfer the differential movement of arm 100 to a link 111. This link, at its upper end, is pivoted to a segment 112 having teeth 113 cooperating with the aliner 69 previously described. The segment is fast on a sleeve 114 surrounding shaft 67. Also fast on this sleeve is an arm 115 (Fig. 11) to which is pivoted a link 116 which, at its lower end, is pivoted to the control plate 86.

It can be seen from the above description that on totalizing operations, the control plate 86 will be automatically set to the position corresponding with the key depressed.

Figure 2:
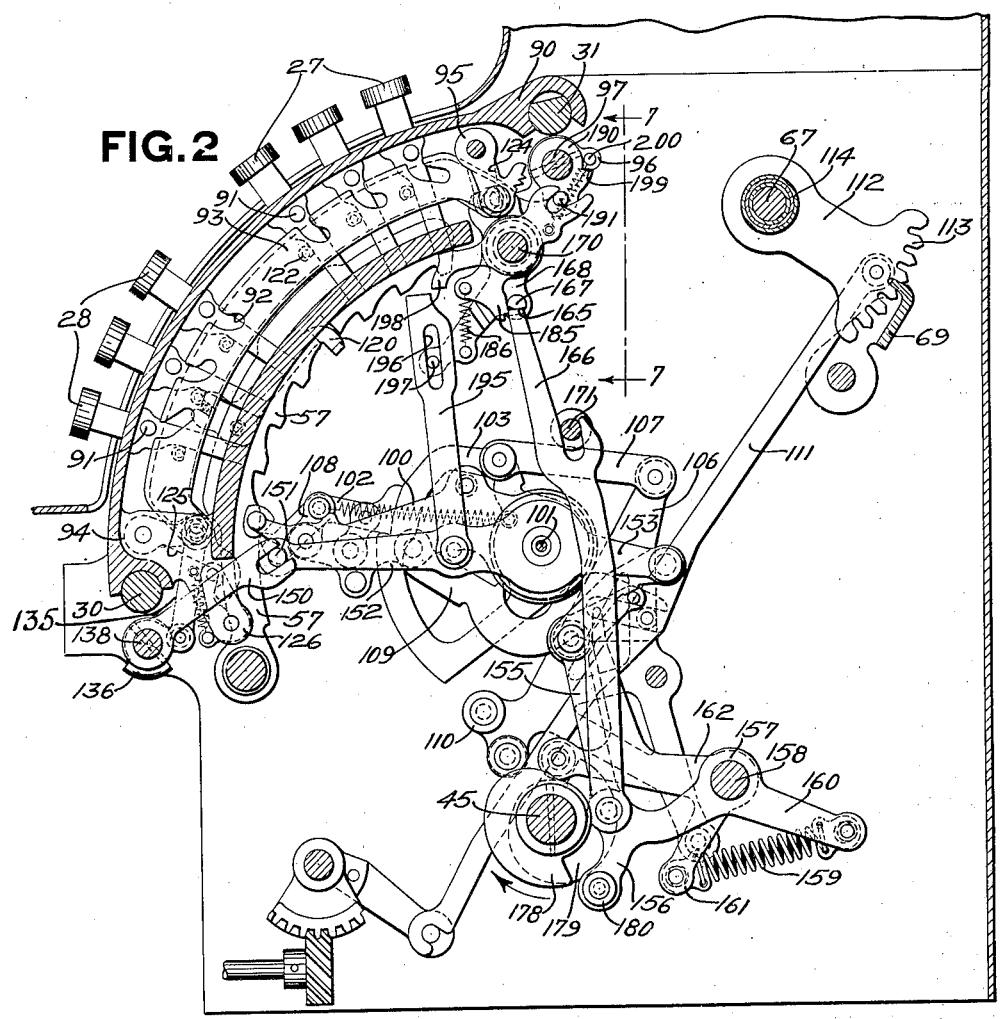
Fig. 2 is a sectional view through the machine just to the right of the control bank.
Figure 3:
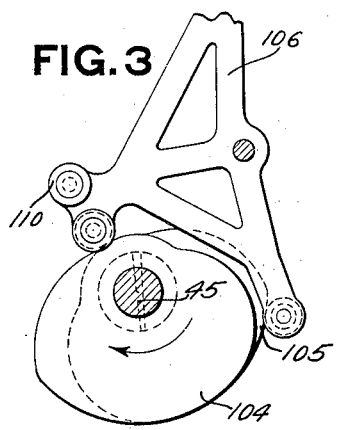
Fig. 3 is a detail side elevation of the cams and the member cooperating therewith which actuate the control bank differential mechanism.

On adding operations it is desired to automatically position the control plate 86 to its adding position without the depression of any keys in the control bank. This is done by means of a pawl 120 (Fig. 2) pivotally mounted on the notched bar 57 for this bank. The upper end of the pawl 120 is bent at right angles and normally lies in the path of the bell crank 108 (Fig. 2). Therefore, when the bell crank strikes this pawl, the latch 102 will be disconnected from the drive segment 103 when the control plate 86 has arrived at its adding position.

Figure 4:
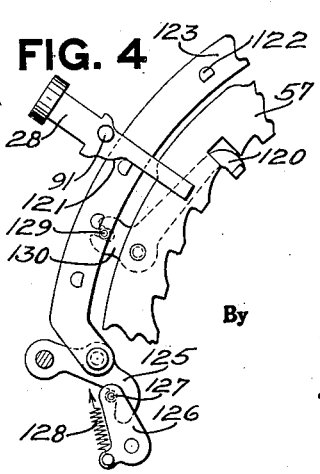
Fig. 4 is a detail side elevation of the mechanism for breaking the latch of the control bank differential in the "Add" position and also the means for rendering this latch-breaking means ineffective.

If, however, one of the total keys 27, 28 is depressed, the pawl 120 will be automatically rocked out of the path of movement of bell crank 108 by the following mechanism. Each of the keys 27 and 28 is provided with a bevelled portion 121 (Figs. 4 and 5). When one of these keys is depressed, the bevelled portion comes into contact with one of a series of pins 122 carried by a locking detent bar 123 movably mounted on two links 124 and 125 (Figs. 2, 4 and 5) pivoted to the key frame 90, and moves said locking detent bar downwardly. Pivoted on a short shaft mounted in the key frame is an arm 126 carrying a pin 127 which contacts with the downwardly extending end of the link 125 (Fig. 4). This arm 126 is normally urged in a clockwise direction by a spring 128 which, through the engagement of pin 127 with link 125, tends to hold the locking detent bar 123 in its upper normal position.

The downward movement of detent bar 123 rocks the pawl 120 to its ineffective position by means of a pin 129 carried by said detent which projects through the bifurcated tail of said pawl and thereby rocks said pawl counter-clockwise.

*Interlocks.*

The proper sequence of operation in totalizing operations is as follows: First, depress the proper key 27 or 28 in the control bank to select the totalizer line desired, then the key 26 in the transaction bank corresponding to the line selected in order to select the individual totalizer on the said line, and then depress the motor bar (not shown) to release the machine. Mechanism is provided to prevent the depression of a transaction key 26 in any bank except the one corresponding to the control key 27, 28 already depressed. This mechanism will now be described.

It will be recalled that the slotted detent bar 93 (Fig. 2) is moved down different distances depending on the key depressed. Pivoted to the lower end of this detent bar is a short link 135 (Fig. 10) which at its lower end, is pivoted to one end of a yoke member 136 journaled on a cross shaft 138. Adjacent each of the banks of transactions keys 26 (Figs. 8, 9 and 13) is an upwardly extending arm 137 of said yoke member, the upper end of which arm is bent at right angles to the vertical portion thereof. The bent or flanged ends of the arms 137 have differentially placed notches 139 formed therein. Each bank of transaction keys 26 has a slotted detent bar 140 pivoted at its upper end to a link 141 and at its lower end to a link 142 (Figs. 9 and 13). A plurality of slots 143 in the detent bar cooperate with pins 144, one for each key, so that upon the depression of any of these keys the detent bar will be moved downwardly as is well known in the art.

The links 142 have downwardly extending tails to cooperate with the notches 139 in the bent or flanged ends of the arms 137. It can, therefore, be seen that when any total key 27, 28 is depressed, the yoke member 136 will be rocked differentially as above described, to move one of the arms 137 with its notch 139 in position to permit the engagement therewith of the tail of link 142 of the bank of transaction keys 26 appropriate to the total key repressed. If a key in any transaction bank but the one appropriate to the depressed total key is operated the tail of its link 142 will abut against a solid portion of the bent end of the arm 137 for that bank and the key will, therefore, be held against depression.

If a transaction key 26 in the second and third banks from the right is first depressed the tail of its appropriate link 142 will be moved into the path of the corresponding arm 137 and then if it is attempted to depress a total key 27 or 28 the end of the bent arm 137 will strike the tail and prevent such depression. The notch 139 in the arm 137 corresponding to the clerks' (initial) bank is located so that the tail of the link 142 can enter it as the corresponding total key is depressed.

In the machine shown in the patents above referred to, in which the control plate 86 is moved manually prior to the operation of the machine, a number of functions are accomplished thereby. Among others the shaft 138 is rocked clockwise (Fig. 2) for the purpose of positioning the mechanism which will cause the driver shaft 45 to be given two complete rotations in total and sub-total operations instead of one, as in adding, and which will cause the release shaft 97 to be rocked to release the keys, at the end of the second cycle of operation. This mechanism is not shown herein but it is necessary to provide mechanism for rocking the shaft 138 previous to an operation of the machine, as in the present invention the control plate 86 is not moved until such operation is begun, and this mechanism will now be described.

Fast to the shaft 138 is an arm 150 (Fig. 2), the end of which is bifurcated and cooperates with a pin 151 carried by a lever 152 pivoted on the bushing 101 for the total bank. This lever has a rearwardly extending portion 153 (Figs. 2 and 12) to which is pivoted a short link 154 which, at its lower end, is pivoted to a bell crank 155. One arm of this bell crank is pivotally connected to one arm 156 of a lever 157 loose on a rod 158 supported by the machine side frame. The other arm of bell crank 155 carries a pin 163 which rests against a surface 164 on the under side of link 154. This lever 157 is adapted to be rocked in a clockwise direction by means of a strong spring 159 stretched between an arm 160 of lever 157 and an arm 161 of a bell crank lever 162 also loose on rod 158. The clockwise movement of lever 157 is normally prevented by the contact of the bent upper end 165 of a retaining member 166 (Figs. 2, 5 and 7), which, at its lower end, is pivoted to said lever 157, with the flat side of a half round stud 167 carried by an arm 168 fast on a sleeve 169 surrounding a shaft 170, supported by the machine side 169 surrounding a shaft 170, supported by the machine side frames. The retaining member 166 has a slot formed therein through which a guiding stud 171 projects.

It can be seen from Figs. 5 and 7 that the hub 169 also carries an arm 172 bifurcated to embrace the pivot pin of the locking detent bar 123 and the link 124. Therefore, when one of the control keys 27 or 28 is depressed and the detent bar 123 is moved downwardly as above described, the arm 172, sleeve 169 and arm 168 will be rocked counter-clockwise far enough to remove the stud 167 from the end of the retaining member 166, whereupon this retaining member will move upwardly due to the clockwise rotation of lever 157 by spring 159. The clockwise movement of lever 157 will raise lever 155 and, through the contact of pin 163 with surface 164, will rock the lever 152 counter-clockwise. This movement, through the slot and pin connection above described, will rock arm 150 and shaft 138 clockwise, (Fig. 2), which shaft will then perform its various functions.

Near the end of the first cycle of a total or sub-total operation of the machine, the retaining member 166 is lowered. At the end of the second cycle, the shaft 138 is rocked counter-clockwise to its normal position. This restoring movement is accomplished by means of a pair of cams 178 and 179 fast on the main drive shaft 45 (Figs. 2 and 12). The cam 178, in its normal position, has a low portion opposite a roller 180 carried by the arm 156 of lever 157. This roller is normally held away from the periphery of the cam 178 due to the contact of the retaining member 166 with the stud 167. When the stud 167 is moved away from the end of the retaining member 166, the lever 157 will be rocked clockwise until the roller 180 contacts with the cam 178. It can be seen that when the cam 178 is rotated, the lever 157 will be rocked counter-clockwise, thereby lowering the retaining member 166 sufficiently to permit a notched spring-pressed non-repeat pawl 185 to engage the retaining member 166 and hold it in its lowered position during the second cycle of operation. The stud 167 resumes its normal position upon the release of the depressed key at the end of the second cycle, and thereby holds said retaining member in its normal position between total and sub-total operations.

The counter-clockwise movement of the lever 157 will also lower the bell crank lever 155. It can be seen from Fig. 12 that this movement would simply serve to straighten out the toggle formed by this lever and the link 154 if means were not provided to push the pivotal point of these two members towards the left, and thereby transfer the rocking movement of said lever 157 to the lever 152 which will then rock the arm 150 and shaft 138 counter-clockwise to normal position. The means for pushing the pivotal point of lever 155 and link 154 to the left (Fig. 12) comprises a finger 181 extending upwardly from the bell crank lever 162, which finger lies against a roller 182 carried by the pivot pin connecting these two members 155 and 154. The bell crank 162 also carries a roller 183 which cooperates with the cam 179 above mentioned. This cam is so formed as to gradually rock the bell crank lever 162 clockwise until just before the end of the first cycle of operation when the roller 183 passes off of a high point on said cam. The clockwise movement of this lever and the counter-clockwise movement of the lever 157 stretches the spring 159. This tends to rock the bell crank lever 162 in a counter-clockwise direction. This rocking movement will be prevented at the end of the first cycle of operation by well known means not herein shown, but fully explained in the patents above referred to. This movement, when permitted at the end of the second cycle of operation through the contact of the finger 181 with the roller 182, will push the pivotal point of link 154 and lever 155 to the left and thereby rock the lever 152 clockwise to normal position, which movement will also return the shaft 138 to normal position through the mechanism above described.

Means is provided to prevent tripping of the total control mechanism as above described, when any key 27, 28 in the control bank is held down for an immediate second operation. Near the end of the first cycle of operation, the retaining member 166 is lowered by the cam 178 as above described. If the depressed total key 27, 28 is held down at the end of the second cycle, the stud 167 will not assume its normal position over the upper end of the retaining member 166, but the non-repeat pawl 185 (Figs. 2 and 5) which has been rocked by its spring 186 at the end of the first cycle to a position where a notch cut therein engages said retaining member 166, will remain in this position and thus prevent upward movement of the retaining member 166 when the low portion of the cam 178 arrives opposite the roller 180. If the key depressed is subsequently released, the stud 167 will be returned to its normal position and will move the non-repeat pawl 185 out of engagement with member 166, and at the same time, contact with and hold said member in its normal position.

Means are also provided by this invention to prevent the release of the machine if an amount key 25 and any of the total keys 27, 28 are in depressed position at the same time. The shaft 97 is the release shaft of the machine. It is constantly under spring tension and tends to move in a clockwise direction (Figs. 2 and 6) when permitted to do so by the operation of the release mechanism, as shown and described in the previously mentioned patents. Fast on the release shaft is an arm 190 (Figs. 2 and 6) which carries a pin 191 projecting through a bifurcation formed in a lever 192 loose on shaft 170. It can be seen from the above that when the release shaft 97 is rocked clockwise, the lever 192 will be rocked counter-clockwise.

The link 34 which supports the lower end of the detent bar 32 for each bank of amount keys (Fig. 1) has a downwardly extending tail 76 which, when a key in its bank is depressed, will be moved to a position beneath a rod 193 carried by a plurality of arms 194 fast on the shaft 138. The rod 193 extends across all of the banks of amount keys. The movement of the tail 76 beneath the rod 193 will prevent the rocking of shaft 138, arm 150, and lever 152 as above described when an amount key is depressed.

Pivoted to the lever 152 is an upwardly extending locking member 195 (Figs. 2 and 5) which has a slot 196 formed therein through which projects a pin 197 carried by the arm 168 previously described. This arm is rocked counter-clockwise by the depression of a total key 27, 28 which, through the pin and slot connection, will rock the locking member 195 clockwise on its pivot. The lever 192 has a forwardly extending arm terminating in a nose 198 (Fig. 2), and when the locking member 195 is rocked by the depression of a total key, the upper end of the locking member will be positioned directly beneath the nose 198 of lever 192 and therefore, as the shaft 138, arm 150 and lever 152 are held rigid by the tail 76 of the amount bank in which a key was depressed, it will be impossible to rotate the shaft 97 to release the machine. The locking member 195 is moved to the position beneath nose 198 whenever a total key is depressed, but if no amount key has been depressed, the lever 152 will rock counter-clockwise and thereby lower the locking member 195 sufficiently to permit the release of the machine.

At the end of the first cycle of total and sub-total operations, return movement of the shaft 138 to normal position is prevented by contact of locking member 195 with the nose 198 of lever 192. When the release shaft 97 is moved to release position at the end of the second cycle of operation, the locking member 195 is permitted to rise, permitting the spring 159 to rock the shaft 138 to home position.

It can also be seen from Fig. 1 that when a total key has been depressed, the shaft 138, and therefore, arms 194 and rod 193 will be rocked counter-clockwise to position the rod 193 in front of the tails 76 for the amount banks and thereby prevent the depression of any keys 25 in said amount banks.

*Release of total keys.*

As described in the previously mentioned patents, near the end of the operation the release shaft 97 is rocked counter-clockwise slightly past normal and then clockwise to normal. On its counter-clockwise rotation past normal position, a shoulder 199 on arm 190 comes into contact with a pin 200 on the pawl 96 and rocks said pawl counter-clockwise far enough to disengage the nose thereof from the notches in the arm 95 which supports the detent bar 93. A spring (not shown) connected to said detent bar will then return it to its normal position and permit the depressed control key to be returned to its undepressed position.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of banks of transaction keys, a bank of controlling keys, and means positioned by the depression of said controlling keys for determining in which of said banks of transaction keys a key may be depressed.

2. In a machine of the class described, the combination of a plurality of banks of transaction keys, a bank of controlling keys, and a yoke member positioned by the depression of any of said controlling keys for determining in which of said banks of transaction keys a key may be depressed.

3. In a machine of the class described, the combination of a plurality of banks of transaction keys, a plurality of arms, one for each bank, adapted to be rocked by the depression of a key in its appropriate bank, a bank of control keys, and a yoke member adapted to be positioned by said control keys for cooperating with said arms to permit a key in only one of said transaction banks to be positioned at a time.

4. In a machine of the class described, the combination of a plurality of banks of transaction keys, a plurality of arms, one for each bank, adapted to be rocked by the depression of a key in its appropriate bank, a bank of control keys, a detent adapted to be differentially moved by the depression of any of said keys, and a yoke member connected to said detent and adapted to cooperate with said arms to permit a key to be depressed only in the bank of transaction keys appropriate to the key depressed in the control bank.

5. In a machine of the class described, the combination of a plurality of keys for controlling the engagement of a plurality of totalizer lines, a plurality of banks of amount keys, and means actuated by the depression of said control keys for preventing the depression of said amount keys.

6. In a machine of the class described, the combination of a plurality of keys for controlling the engagement of a plurality of totalizer lines, a plurality of banks of amount keys, a release shaft, and means controlled by the depression of any amount key for preventing release of the machine by the release shaft after depression of any of said control keys.

7. In a machine of the class described, the combination of a plurality of banks of transaction keys, a bank of control keys for controlling totalizing operations, and means actuated differentially by said control keys for locking against depression transaction banks corresponding to the keys not depressed.

8. In a machine of the class described, the combination of a plurality of banks of transaction keys, a bank of control keys comprising a set of sub-totaling control keys and a set of reset-totaling control keys, each set comprising a key corresponding to the banks of transaction keys, and means operated by any control key for locking out the keys in transaction banks not corresponding thereto.

9. The combination of a plurality of transaction banks of keys, a rockable member, differentially arranged means thereon for cooperation with said banks to selectively lock out certain banks and permit another to be operated, and keys for controlling the cooperation between said rockable member and said transaction banks.

10. The combination of a plurality of transaction banks of keys, a rockable member, differentially arranged means thereon for cooperation with said banks to selectively lock out certain banks and permit another to be operated, and differentially movable key-controlled means for controlling the cooperation between said rockable member and said transaction banks.

11. The combination of a plurality of banks of transaction keys, a differentially movable member for selecting the same for operation, and a plurality of pairs of keys for controlling the differential movement of said member, either key of a pair effecting the same control over said member.

12. In a machine of the class described, the combination of amount keys, total control keys, movable means locked against movement by a depression of an amount key, and other means locked against movement in one direction by operation of said movable means, and movable in another direction upon operation of said control keys to prevent release of the machine.

13. In a machine of the class described, the combination of amount keys, total control keys, a member movable upon releasing the machine, and means positioned by said control keys following depression of an amount key for obstructing said movable member.

14. In a machine of the class described, the combination of amount keys, total control keys, a member movable upon releasing the machine, and means positioned upon operation of a total control key and held against movement upon operation of an amount key for obstructing movement of said member.

15. In a machine of the class described, the combination of amount keys, total control keys, a member normally permitting release of the machine in adding operations, and means controlled by said total control keys for positioning said member to prevent release of the machine upon operation of a total control key subsequently to depression of an amount key.

16. In a machine of the class described, the combination of amount keys, total control keys, a member normally positioned to permit an operation of the machine, means controlled by said control keys for moving said member in position to prevent release of the machine, means controlled by said total control keys for moving said member to ineffective position, and means operated by an amount key to prevent movement of said member to ineffective position.

In testimony whereof I affix my signature.

BERNIS M. SHIPLEY.